US009997757B2

(12) United States Patent
Nakayama et al.

(10) Patent No.: US 9,997,757 B2
(45) Date of Patent: *Jun. 12, 2018

(54) CELL CONNECTION ASSEMBLY

(75) Inventors: Osamu Nakayama, Yokkaichi (JP); Ryoya Okamoto, Yokkaichi (JP); Mitsutoshi Morita, Yokkaichi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 199 days.

This patent is subject to a terminal disclaimer.

(21) Appl. No.: 13/978,256

(22) PCT Filed: Feb. 13, 2012

(86) PCT No.: PCT/JP2012/053241
§ 371 (c)(1),
(2), (4) Date: Jul. 3, 2013

(87) PCT Pub. No.: WO2012/120974
PCT Pub. Date: Sep. 13, 2012

(65) Prior Publication Data
US 2013/0280589 A1    Oct. 24, 2013

(30) Foreign Application Priority Data
Mar. 7, 2011    (JP) .................. 2011-049071

(51) Int. Cl.
*H01M 2/20*    (2006.01)
*H01M 2/10*    (2006.01)

(52) U.S. Cl.
CPC ......... *H01M 2/202* (2013.01); *H01M 2/1077* (2013.01); *H01M 2/206* (2013.01); *H01M 2220/20* (2013.01)

(58) Field of Classification Search
CPC ........ H01M 2/20; H01M 2/1011; H01M 2/22; H01M 2/206; H01M 2/202
See application file for complete search history.

(56) References Cited

U.S. PATENT DOCUMENTS 5,804,770 A    9/1998 Tanaka
6,010,375 A    1/2000 Higuchi
(Continued)

FOREIGN PATENT DOCUMENTS

JP    9-106802    4/1997
JP    11-25844    1/1999
(Continued)

OTHER PUBLICATIONS

Translation of JP 2009043637 A from AIPN—Online Translation.*
International Search Report, dated May 1, 2012.

*Primary Examiner* — Michael L Dignan
(74) *Attorney, Agent, or Firm* — Greenblum & Bernstein, P.L.C.

(57) ABSTRACT

A cell connection assembly includes a first unit holding one side in a connection direction of a long connection member, and a second unit holding the other side in the connection direction of the long connection member. The first unit and the second unit are configured to be slidable and movable with respect to the long connection member in the connection direction of the long connection member. Even when there is a dimensional error between a plurality of electric cells and the cell connection assembly attached thereto, positions of the first unit and the second unit relative to each other can be changed with the long connection member in response to the dimensional error.

9 Claims, 9 Drawing Sheets

(56) References Cited

U.S. PATENT DOCUMENTS

| | | | | |
|---|---|---|---|---|
| 6,261,719 B1* | 7/2001 | Ikeda | ................ | H01M 2/202 |
| | | | | 429/120 |
| 6,275,003 B1 | 8/2001 | Marukawa et al. | | |
| 7,556,533 B2* | 7/2009 | Seo | ................ | H01M 2/0242 |
| | | | | 320/116 |
| 2003/0193313 A1* | 10/2003 | Takedomi | .......... | H01M 2/1077 |
| | | | | 320/107 |
| 2011/0104556 A1* | 5/2011 | Kim | ................ | H01M 2/1077 |
| | | | | 429/160 |
| 2012/0127676 A1* | 5/2012 | Warmuth | .......... | H01M 2/202 |
| | | | | 361/748 |

FOREIGN PATENT DOCUMENTS

| | | | | |
|---|---|---|---|---|
| JP | 11-067184 | | 3/1999 | |
| JP | 2001-57196 | | 2/2001 | |
| JP | 2001-229897 | | 8/2001 | |
| JP | 2002-164034 | | 6/2002 | |
| JP | 2009043637 A | * | 2/2009 | |
| JP | 2011-008957 | | 1/2011 | |
| WO | WO 2011/012215 | * | 2/2011 | ............. H01M 2/20 |

\* cited by examiner

CELL CONNECTION ASSEMBLY

TECHNICAL FIELD

The present invention relates to a cell connection assembly.

BACKGROUND ART

In a battery module for electric automobiles or hybrid automobiles, a plurality of flat electric cells having positive and negative electrode terminals are aligned in a short-length direction of a surface having the electrode terminals. The electrode terminals of adjacent electric cells are connected by connection members (bus bars), and thus, the plurality of electric cells are connected in series or in parallel (refer to Patent Literature 1).

Then, in order to simplify work to attach connection members, it has been considered that, as shown in Patent Literature 2, the connection members be housed in a plurality of resin connection units and a cell connection assembly connecting the connection units be integrally attached to a plurality of electric cells.

CITATION LIST

Patent Literature

Patent Literature 1: Japanese Patent Laid-Open Publication No. H11-067184
Patent Literature 1: Japanese Patent Laid-Open Publication No. 2011-8957

SUMMARY OF INVENTION

Problem to be Solved

In the configuration above, however, the cell connection assembly is attached to the plurality of electric cells, which are flat electric cells aligned in a short-length direction. Therefore, the employed connection unit extending in the same direction as the alignment direction of the electric cells is relatively short. On the other hand, there is a case where the connection direction of the connection unit may be long, instead of being short as described above. For example, when flat electric cells are aligned in a long-length direction of a surface having electrode terminals, the connection direction of the connection unit tends to be long. When the connection direction of the connection unit becomes longer, variation in dimensional accuracy between the connection unit and the plurality of electric cells tends to be particularly large, and thus flaws in installation of the cell connection assembly become a concern.

Solution to Problem

In view of the circumstances above, the present invention is perfected to prevent flaws in installation of a cell connection assembly.

(1) The present invention is a cell connection assembly having a connection member connecting electrode terminals of adjacent electric cells in a battery module including a plurality of electric cells having positive and negative electrode terminals. The cell connection assembly includes a first unit holding one side in a connection direction of the connection member and a second unit holding the other side in the connection direction of the connection member. At least one of the first unit and the second unit is slidable and movable with respect to the connection member in the connection direction of the connection member.

According to the present configuration, even when there is a dimensional error between the plurality of electric cells and the cell connection assembly to be attached thereto, since at least one of the first unit and the second unit is slidable and movable with respect to the connection member in the connection direction thereof, positions of the first unit and the second unit relative to each other can be changed with the connection member in response to the dimensional error. Therefore, flaws in installation of the cell connection assembly due to a dimensional error or the like can be prevented.

The following configurations are preferably included in addition to the configuration above.

(2) An engaged portion is provided to a side edge in the connection direction of the connection member, and an engaging portion is provided to at least one of the first unit and the second unit, the engaging portion engaging with the engaged portion with a predetermined clearance in the connection direction.

For instance, after each unit is fixated to the electric cells by a member other than the connection member, the connection member becomes slidable and movable within a range of the predetermined clearance. Therefore, even when there is a dimensional error between the electrode terminals, since the connection member can move in the connection direction within the range of the predetermined clearance, work to install the connection member becomes easier.

(3) The engaging portion and the engaged portion are provided in a plurality of positions in the connection direction.

By doing so, compared to a case where the engaging portion and the engaged portion are each provided in one position, greater dimensional error can be accommodated, and thus flaws in installation of the cell connection assembly can be prevented more successfully.

(4) A positioning portion is provided to each of the first unit and the second unit in a position different from the connection member, the positioning portion performing positioning with respect to the electric cells.

Since the positions of the first unit and the second unit can be set by the positioning portion, work to fixate the connection member becomes easier when the connection member is fixated after the positions are set.

(5) A bar-shaped electrode terminal or a shaft of a bolt is inserted into a through-hole of the connection member to fixate the cell connection assembly to the electric cells. The through-hole has an oval shape elongated in the connection direction of the connection member.

Since the through-hole of the connection member has an oval shape elongated in the connection direction of the connection member, even when there is a dimensional error due to variation in dimensional accuracy between the electrode terminals, the dimensional error can be accommodated, thus enabling the bar-shaped electrode terminal or the shaft of the bolt to be inserted into the through-hole of the connection member.

(6) The plurality of electric cells are flat and are aligned along a long-length direction of a surface having the electrode terminals.

Positions of the electrode terminals vary depending on dimensional accuracy of the electric cells. Variation in dimensional accuracy is more likely to occur particularly in the long-length direction of the electric cells due to its length, and thus, a dimensional error between the plurality of electric cells and the cell connection assembly tends to be greater. According to the present configuration, flaws due to the dimensional error can be prevented in a case where such a dimensional error is likely to occur.

(7) The plurality of electric cells are also aligned along a short-length direction of the surface having the electrode terminals, and another connection member is provided to connect the electrode terminals aligned along the short-length direction.

By doing so, a degree of freedom in connecting the plurality of electric cells can be increased.

Advantageous Effects of Invention

The present invention prevents flaws in installation of a cell connection assembly.

DESCRIPTION OF EMBODIMENTS

First Embodiment

Hereafter, an embodiment of the present invention is described with reference to FIGS. 1 to 9.

Figure 8:
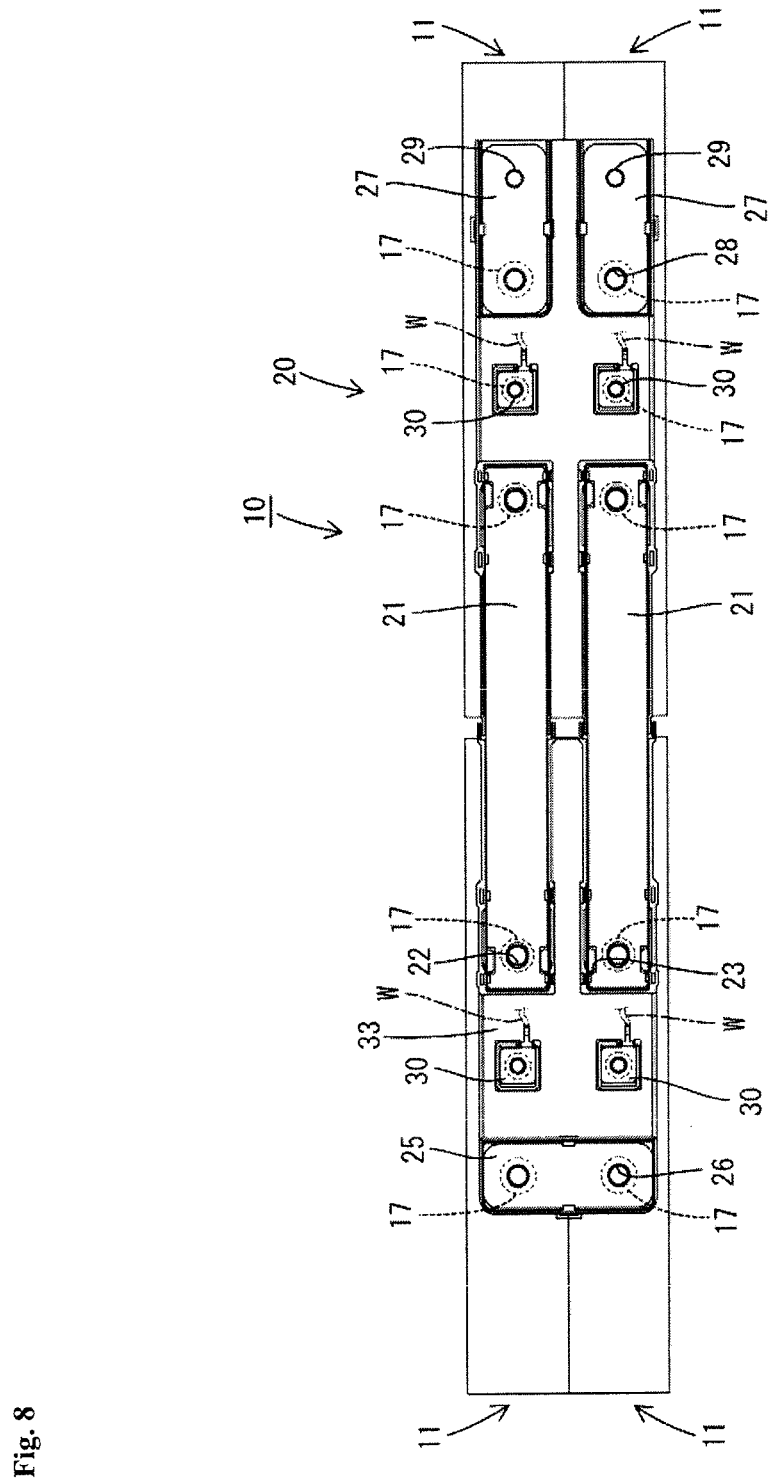
FIG. 8 A plan view showing a state in which the cell connection assembly is attached to a plurality of electric cells FIG. 9 A plan view showing a state in which the cell connection assembly is attached to the plurality of electric cells in the sectional view taken along A-A in FIG. 1
Figure 9:
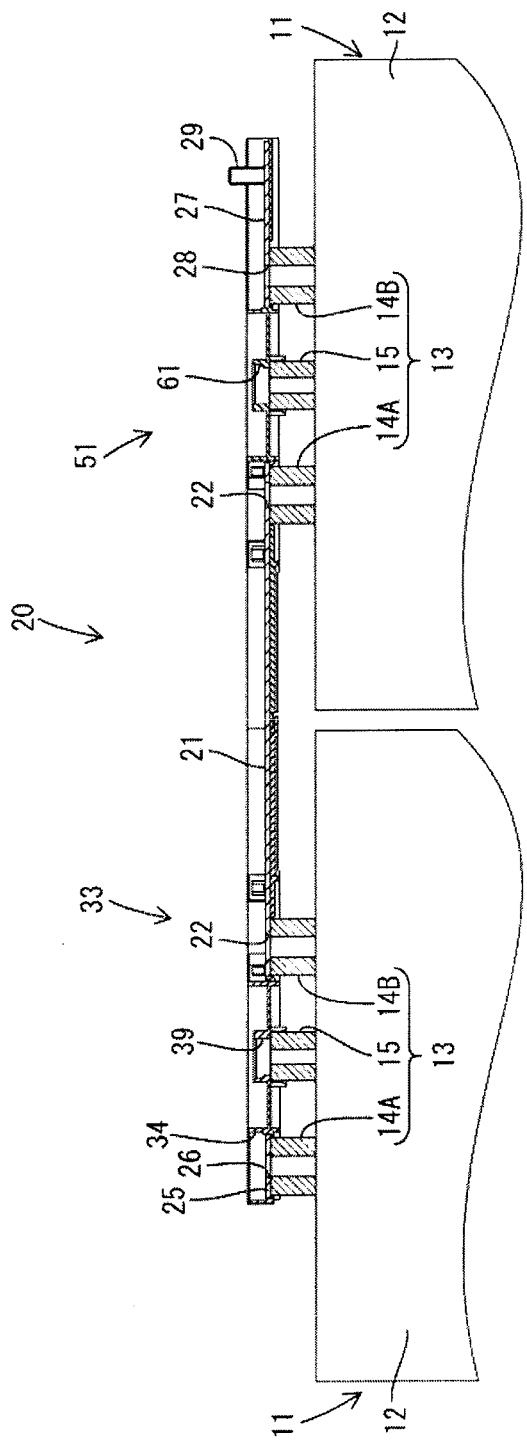

As shown in FIG. 9, in a battery module 10 including a plurality of electric cells 11 having a positive electrode terminal 14A and a negative electrode terminal 14B, a cell connection assembly 20 of the present embodiment connects the electrode terminals 14A and the electrode terminals 14B of adjacent electric cells 11 with connection members 21 and 25. The battery module 10 to which the cell connection assembly 20 is attached is used as a drive source for vehicles such as electric automobiles and hybrid automobiles, for example. In the descriptions below, an up-down direction is defined based on FIG. 9, and for a front-back direction, left in FIG. 8 is defined as front and right as back.

As shown in FIG. 8, the battery module 10 is configured with, for example, four (a plurality of) electric cells 11 and the cell connection assembly 20 having the connection members 21 and 25 connecting the four electric cells 11 in series.

As shown in FIG. 9, the electric cells 11 each have a main body 12 housing a power generating element (not shown in the drawings), and terminals 13 vertically protruding from an upper surface (terminal surface 12A) of the main body 12.

The main body 12 has a flat rectangular parallelepiped shape (approximately the same as the shape of the entire electric cell), and the upper surface of the main body 12 is the terminal surface 12A having the terminals 13 (surface having electrode terminals). The terminal surface 12A has an anteroposteriorly elongated rectangular shape.

The terminals 13 include a front-back pair of electrode terminals 14A and 14B (a positive terminal shown as 14A and a negative terminal as 14B in the drawings) each having a cylindrical shape, and a terminal 15 for voltage detection having a squared tube shape and provided in the middle between the pair of electrode terminals 14A and 14B.

The electrode terminals 14A and 14B are each a round tubular nut (round nut with a top hole) provided with a circular screw hole penetrating through the center thereof. The terminal 15 for voltage detection is a nut having a squared tube shape (square nut) and is provided with a circular screw hole penetrating through the center thereof. Shafts of bolts 17 are screwed to these nuts to fixate the connection members 21 and 25 and voltage detection terminals 30.

The terminal 15 for voltage detection detects voltage approximately in the middle between the electrode terminal 14A and the electrode terminal 14B.

As shown in FIG. 8, of the four electric cells 11, two (a plurality) are aligned in a front-back direction (long-length direction of the terminal surface 12A) and two (a plurality) are aligned in a left-right direction (short-length direction in the terminal surface 12A). The electric cells 11 are each arranged such that polarities (positive and negative) of the electrode terminals 14A and 14B are opposite to the polarities of adjacent electrode terminals 14A and 14B in the short-length direction of the terminal surface 12A.

The four electric cells 11 are fixated by holding plates (not shown in the drawings).

The cell connection assembly 20 includes long connection members 21 (an example of "connection members" which are components of the present invention), a short connection member 25 (an example of "another connection member" which is a component of the present invention), terminal connection members 27, a plurality of voltage detection terminals 30, a first unit 33, and a second unit 51, each long connection member 21 connecting the electrode terminal 14A and the electrode terminal 14B of different electric cells 11 adjacent to each other with a predetermined space therebetween in the front-back direction, the short connection member 25 connecting the electrode terminal 14A and the electrode terminal 14B of the electric cells 11 adjacent in the left-right direction with a distance shorter than the distance between the electrode terminal 14A and the electrode terminal 14B (the long connection member 21) described above, the terminal connection members 27 being externally connected at an end portion of the serially connected electric cells 11, the first unit 33 being attached to two electric cells 11 provided on a front side (one side) and holding a front side (one side in a connection direction) of the long connection members 21, and the second unit 51 being attached to two electric cells 11 provided on a back side (the other side) and holding a back side (the other side in the connection direction) of the long connection members 21.

Figure 7:
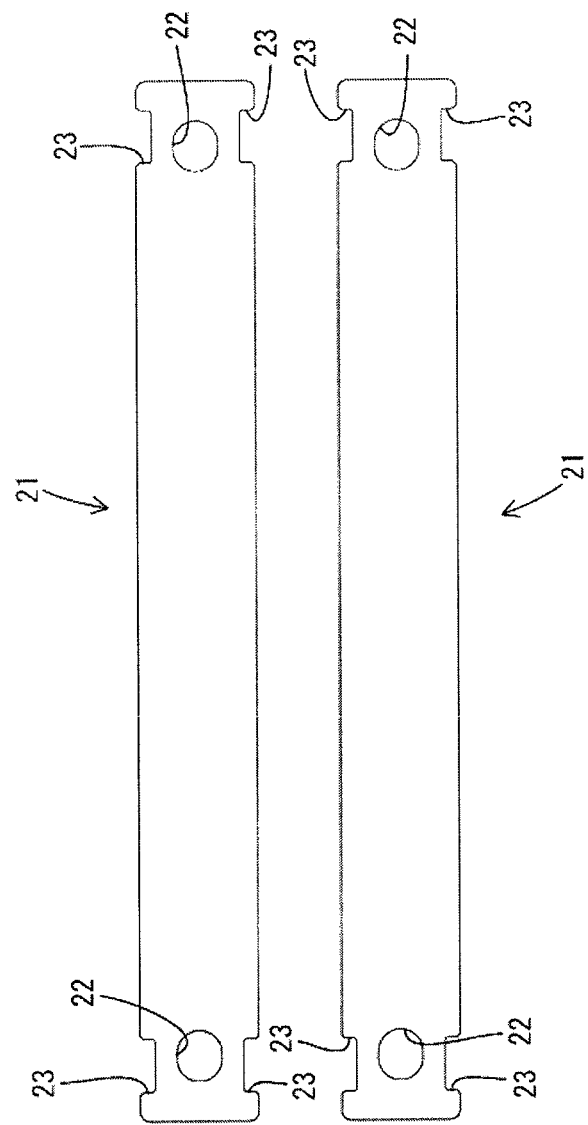
FIG. 7 A plan view showing long connection members

Each long connection member 21 is made from a metal such as copper, copper alloy, stainless steel (SUS), or aluminum, and, as shown in FIG. 7, has a plate shape having a length (long length) corresponding to the distance between the electrode terminal 14A and the electrode terminal 14B to be connected. At end portions in front and back, the long connection members 21 are each provided with a pair of through-holes 22 (an example of "through-holes" which are components of the present invention, and which communicate to the screw holes of the electrode terminals 14A and 14B) into which the shafts of the bolts 17 are inserted.

Each through-hole 22 has an oval shape elongated in the front-back direction (connection direction) or a circular shape.

At left and right side edges of the long connection member 21 proximal to positions of the through-holes 22 (positions of the electrode terminals 14A and 14B) in the front-back direction, a left and right pair of engaged portions 23 are provided by cutting out anteroposteriorly elongated rectangles (step-like shapes) from the side edges (by narrowing the width of the long connection member in a step-like manner). Left and right ends of each engaged portion 23 are tapered to round corners.

Figure 1:
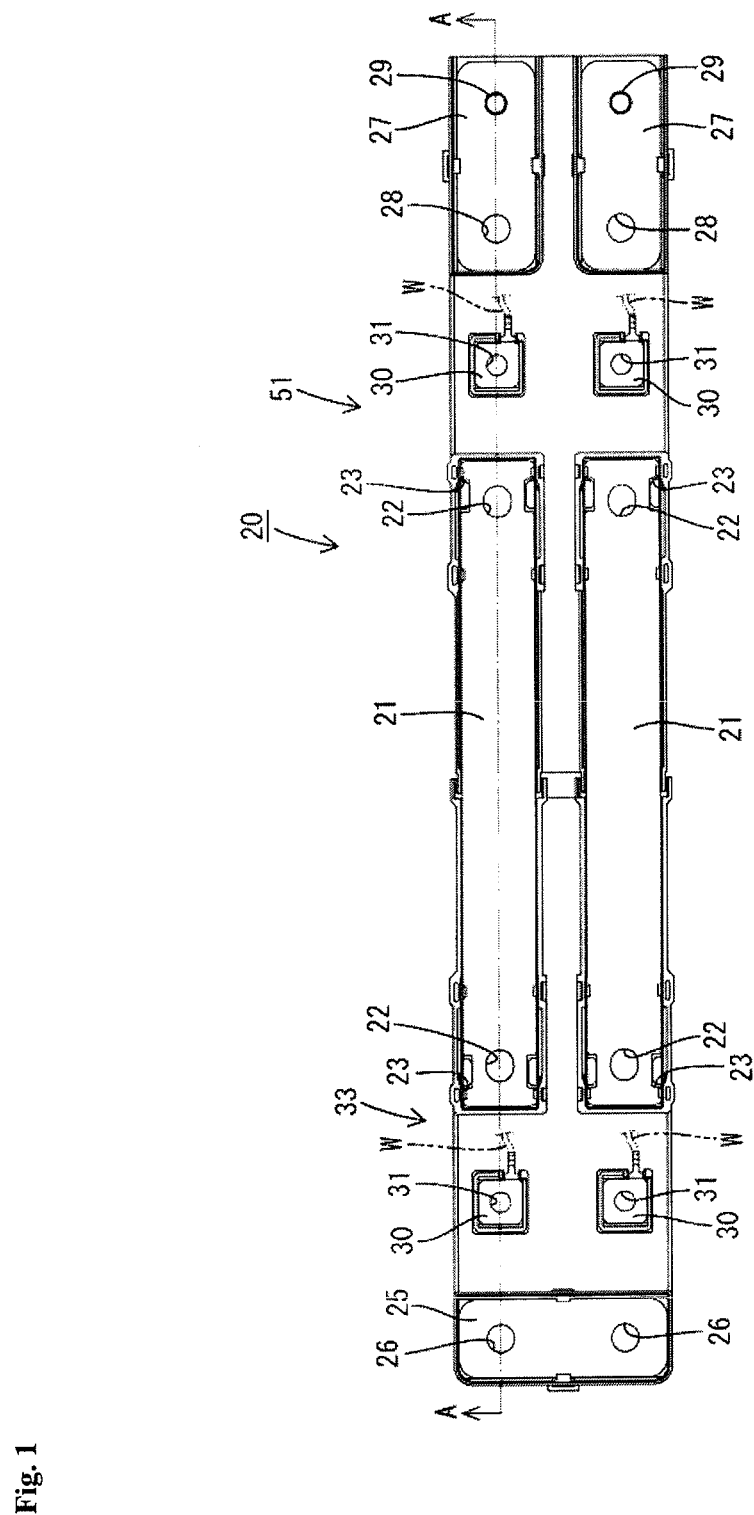
FIG. 1 A plan view showing a cell connection assembly of an embodiment 1

The short connection member 25 is made from a metal such as copper, copper alloy, or stainless steel (SUS), and, as shown in FIG. 1, has substantially a rectangular plate shape having a length corresponding to the distance between the electrode terminal 14A and the electrode terminal 14B to be connected in the left-right direction. The short connection member 25 is provided with a pair of through-holes 26 in the left-right direction (connection direction), the shafts of the bolts 17 being inserted therein.

The terminal connection members 27 are each made from a metal such as copper, copper alloy, or stainless steel (SUS). A through-hole 28 is provided at a front side of each terminal connection member 27 to pass the shaft of the bolt 17. A round bar-shaped external connection terminal 29 protrudes from a back side of each terminal connection member 27 to connect to a terminal at a terminus of an electric wire continuing to an external inverter or the like.

Each voltage detection terminal 30 detects voltage of the electric cells 11 and has a crimp portion, to which a voltage detection wire W is crimped, behind a rectangular flat plate portion.

At the center of the flat plate portion, a circular through-hole 31 is provided enabling insertion of the shaft of the bolt 17. The crimp portion is crimped with a strand exposed at a terminus of the voltage detection wire W.

The voltage detection wire W is connected to a battery ECU (not shown in the drawings). The battery ECU includes a microcomputer, an element, and like, and has a known configuration having functions to detect voltage, electric current, and temperature of the electric cells 11, to control charge and discharge of each electric cell 11, and the like.

Figure 4:
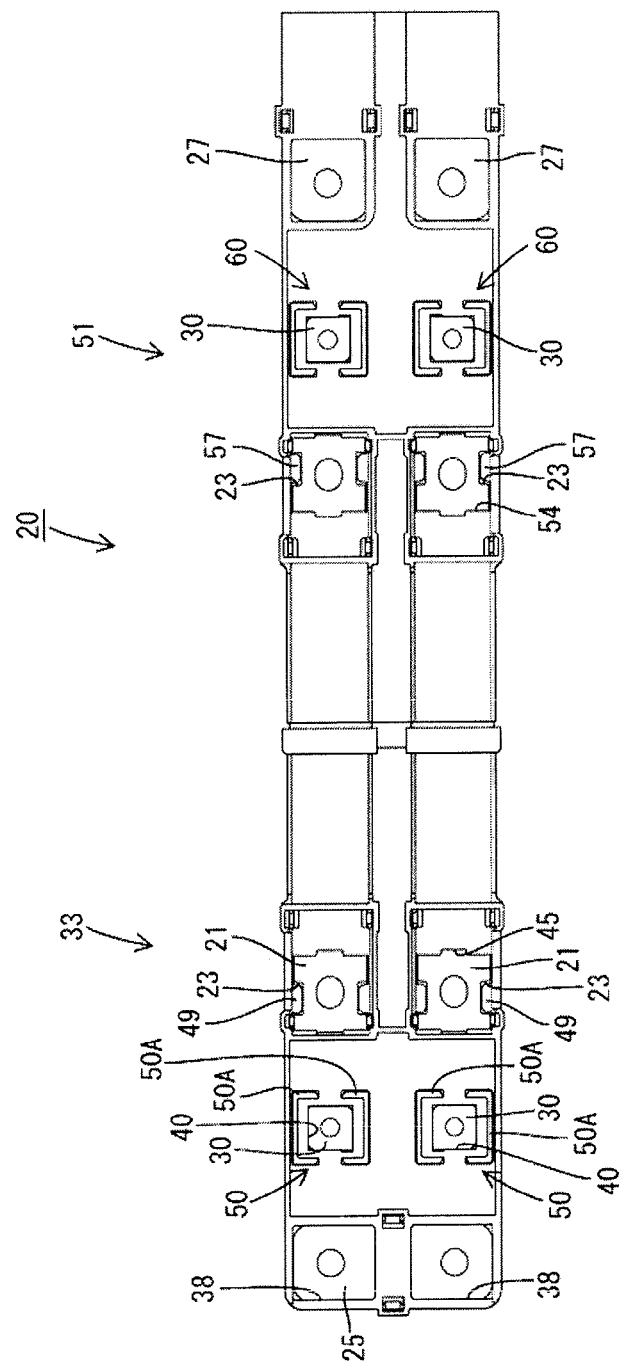
FIG. 4 A bottom view showing the cell connection assembly
Figure 5:
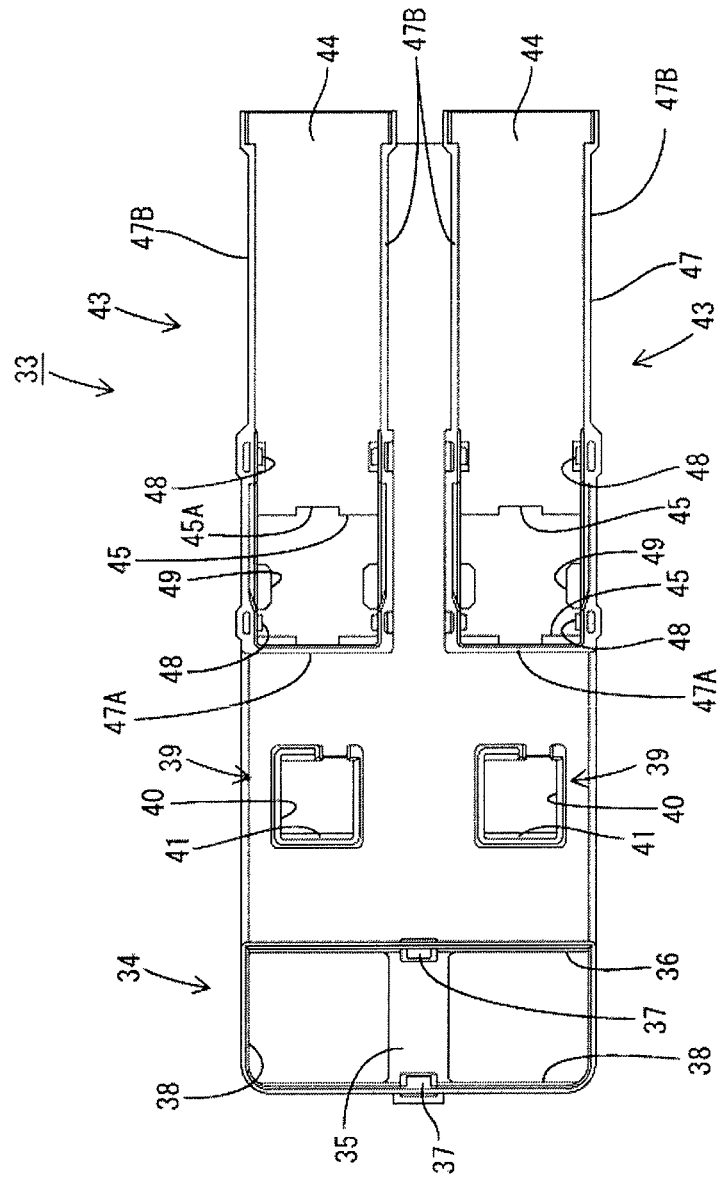
FIG. 5 A plan view showing a first unit

The first unit 33 is made of a synthetic resin, and, as shown in FIG. 5, includes a short housing 34 housing the short connection member 25, detector housings 39 housing the voltage detection terminals 30, first holders 43 holding one side in a longitudinal direction (connection direction) of the long connection members 21, and positioning portions 50 (FIG. 4) provided on a rear surface side of the detector housings 39 and positioned when the terminals 15 for voltage detection are fitted therein.

The short housing 34 is provided to a front end portion of the first unit 33. The short housing 34 is provided with a bottom plate 35 on which the short connection member 25 is placed, a squared tube-shaped housing wall 36 surrounding the short connection member 25, and a pair of locking portions 37 locking the short connection member 25 within the short housing 34.

The bottom plate 35 connects base end portions of the opposing housing walls 36 in the middle in the left-right direction of the housing walls 36.

At left and right sides of the bottom plate 35, rectangular openings 38 are provided. The openings 38 each have a size that allows the cylindrical electrode terminals 14A and 14B to be inserted therein and have a front-back direction length that allows upper end portions of the electrode terminals 14A and 14B to be inserted therein with a small gap maintained in the front-back direction.

The housing wall 36 is defined high enough to prevent tools and the like from making contact with the short connection member 25 and heads of the bolts 17 and from causing a short circuit.

The locking portions 37 are provided to the housing walls 36 above front and back end portions of the bottom plate 35 in order to lock on an upper surface side (of edges) of the short connection member 25 and to prevent detachment of the short connection member 25.

Each locking portion 37 has a shape having a sloped surface with a protrusion amount increasing downwardly in a sloped manner and a lower end protruding in a step-like manner from an inner surface of the housing wall 36. Each locking portion 37 is provided to a distal end portion (lower end portion) of a bending piece provided between a left-right pair of slits.

When the short connection member 25 is installed, a side edge of the short connection member 25 is inserted below one of the locking portions 37, and the other side edge is slid along the sloped surface and pushed under the locking portion 37, and thereby, the short connection member 25 can be installed.

The detector housings 39 each have a terminal mount 41 that fits on and positions the voltage detection terminal 30, and a rectangular opening 40 that allows an upper end portion of the terminal 15 to be inserted, the terminal 15 detecting the voltage of the electric cell 11.

The first holders 43 are each provided with a bottom plate 44 on which the long connection member 21 is placed, a peripheral wall 47 that surrounds three sides on the front side of the long connection member 21 with an open back end, a plurality of locking portions 48 that protrude toward an inner surface side of the peripheral wall 47 and lock on an upper surface side of side edges of the long connection member 21, and engaging portions 49 that engage with the engaged portions 23 of the long connection member 21 and allow the long connection member 21 to move (shift position) in the front-back direction within a predetermined range.

In front of the bottom plates 44, openings 45 are provided in which the bottom plates 44 are not provided. The openings 45 allow the upper end portions of the electrode terminals 14A and 14B to be inserted therein and are each provided with a front-back pair of cut-outs 45A in the middle in the width direction.

Since the electrode terminals 14A and 14B each have a cylindrical shape, the cut-outs 45A are defined to accommodate (avoid) a middle portion in the width direction protruding from front and back of each of the electrode terminals 14A and 14B. Thereby, the electrode terminals 14A and 14B can be inserted into the openings 38 with a small gap maintained in the front-back direction.

The peripheral wall 47 is defined high enough to prevent tools and the like from making contact with the electrode terminals 14A and 14B and the connection members and from causing a short circuit. The peripheral wall 47 is configured with an end wall 47A at a front end and a left-right pair of side walls 47B.

Back end portions of the side walls 47B are slightly widened in a step-like manner to fit with the side walls 55B of the second unit 51 which are slightly narrowed in a step-like manner. Thereby, the positions of both units 33 and 51 are fixed.

A left-right pair of locking portions 48 are provided on each of front and back sides in the side walls 47B, the pair of locking portions 48 protruding inwardly from base end portions of the side walls 47B. Each locking portion 48 has a shape having a sloped surface with a protrusion amount increasing downwardly in a sloped manner and a lower end protruding from the peripheral wall 47 in a step-like manner. Each locking portion 48 is provided at a distal end portion (lower end portion) of a bending piece provided between a left-right pair of slits.

Locking strength of the locking portions 48 (strength of locking force decided mainly by distance to the bottom plate 44) is defined such that the long connection member 21 is not detached from between the bottom plate 44 and the locking portions 48, and the long connection member 21 is slidable and movable in the front-back direction. When the long connection member 21 is installed, one side edge of the long connection member 21 is inserted below one of the locking portions 48, and the other side edge is slid along the sloped surface and pushed under the locking portions 48, and thereby, the long connection member 21 can be installed.

The engaging portions 49 are rectangular (step-like) and project inwardly from positions corresponding to the engaged portions 23 of the long connection members 21, specifically, from the base end portions of the side walls 47B in positions having the openings 45 at the front end. A protrusion amount of the engaging portion 49 is slightly smaller than a length of the engaged portion 23 cut out from the side surface of the long connection member 21. Vertical positions of the engaging portions 49 are the same as those of the long connection members 21. Corners of the engaging portions 49 are tapered to be rounded.

Figure 2:
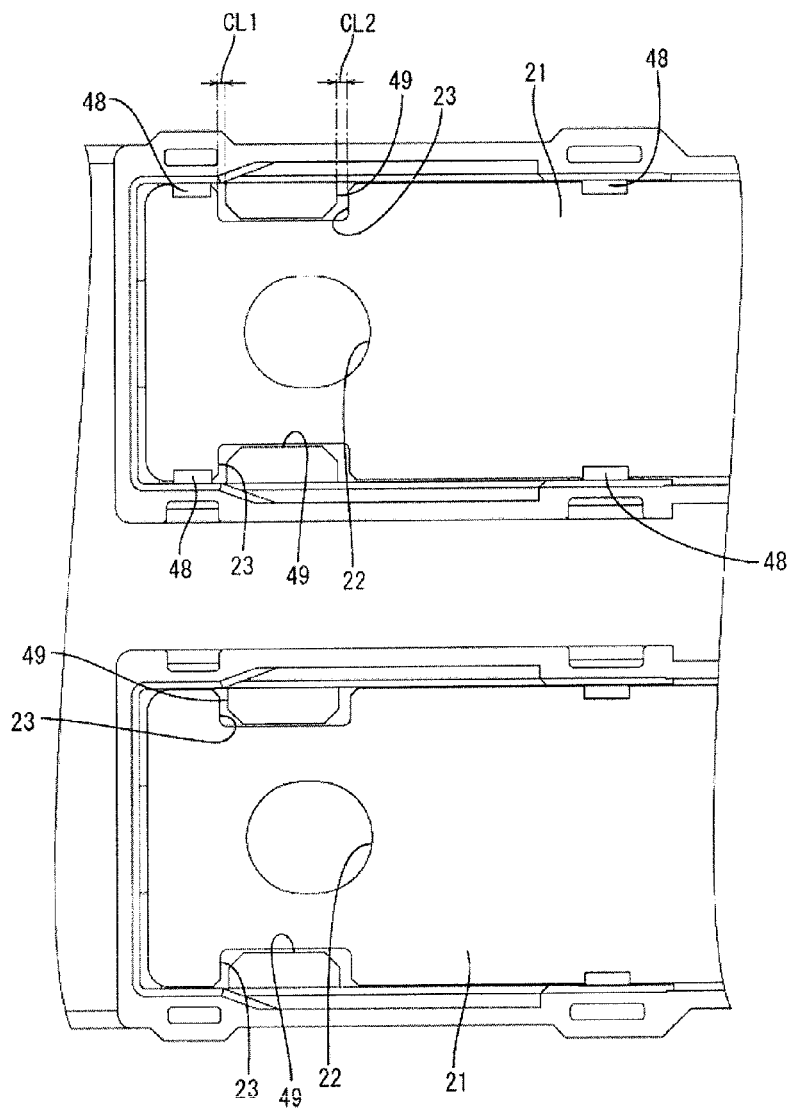
FIG. 2 An enlarged diagram of engaging portions and engaged portions in FIG. 1
Figure 3:
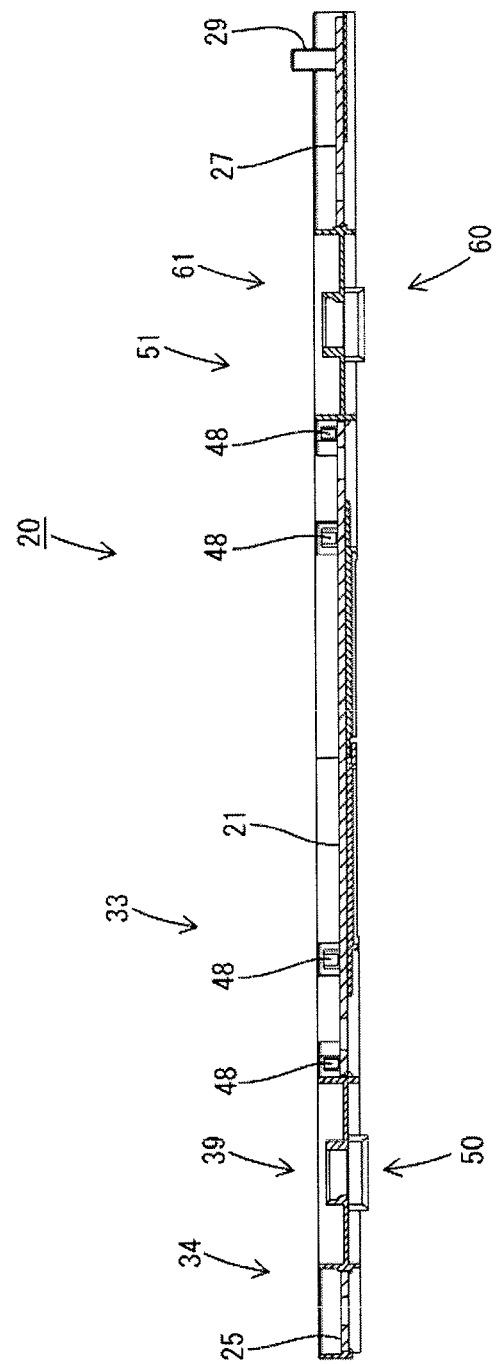
FIG. 3 A cross-sectional view taken along A-A in FIG. 1

The front-back direction (connection direction of the long connection member 21) of the engaging portion 49 is slightly shorter than the front-back direction length of the engaged portion 23. Specifically, as shown in FIG. 2, the engaged portion 23 is defined to have a length corresponding to the engaging portion 49 with clearances CL1 and CL2 (gaps) added to the front and back of the engaging portion 49.

This enables the long connection members 21 to slide and move in the front-back direction with respect to the first unit 33 within a predetermined range of the clearances CL1 and CL2 (CL1+CL2).

As shown in FIG. 4, each positioning portion 50 is configured with a pair of positioning frames 50A provided on a rear surface side of the detector housings 39 so as to surround the opening 40. The pair of positioning frames 50A each have a squared U-shape and face each other. The positioning frames 50A are positioned in the positions of the terminals 15 for voltage detection when the upper end portions of the squared tube-shaped (rectangular) terminals 15 for voltage detection are housed (fitted) therein with substantially no gap.

Figure 6:
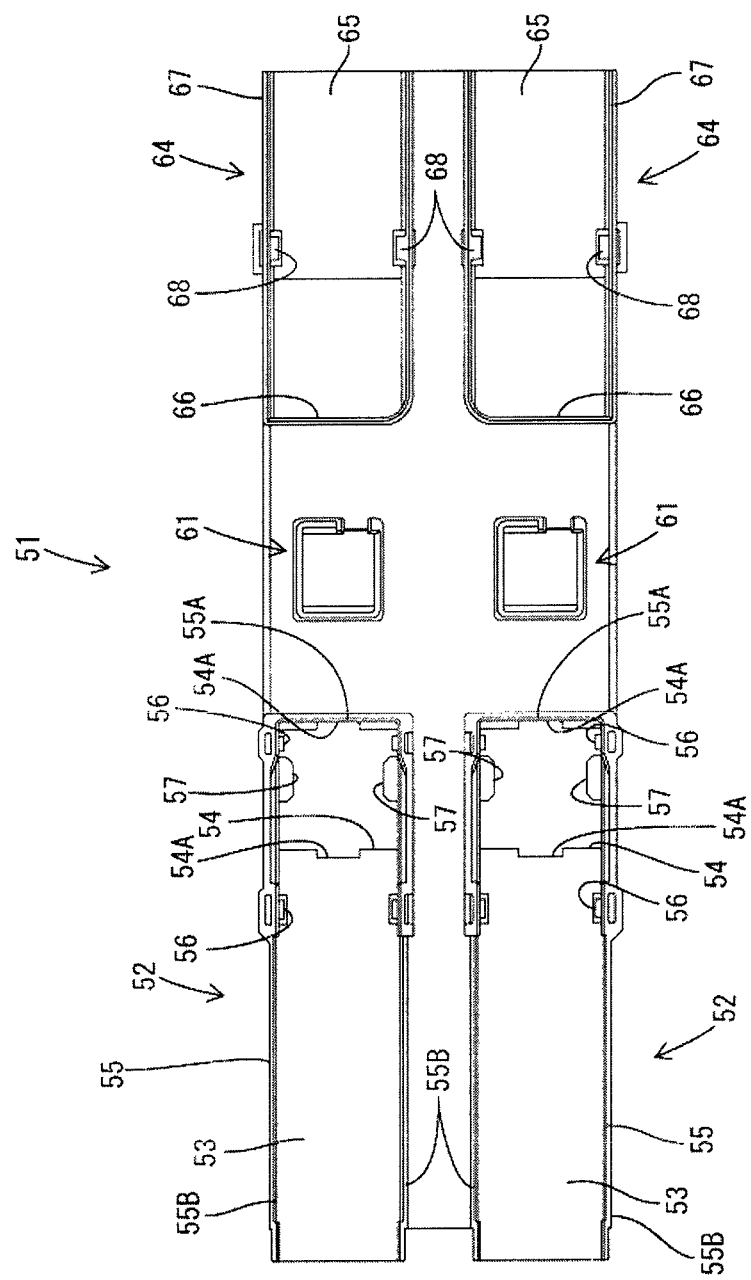
FIG. 6 A plan view showing a second unit

The second unit 51 is made of a synthetic resin and, as shown in FIG. 6, includes second holders 52, detector housings 61, terminal housings 64, and positioning portions 60 (FIG. 4), the second holders 52 holding the back side (the other side in the connection direction) of the long connection members 21, the detector housings 61 housing the voltage detection terminals, the terminal housings 64 housing the terminal connection members 27, the positioning portions 60 being provided on the reverse surface side of the detector housings 39 and positioned when the terminals 15 for voltage detection are fitted therein.

Each second holder 52 has a shape substantially symmetric to the first holder 43 of the first unit 33. Each second holder 52 is provided with a bottom plate 53, a peripheral wall 55, a plurality of locking portions 56, and engaging portions 57, the long connection member 21 being placed on the bottom plate 53, the peripheral wall 55 surrounding three sides on the back side of the long connection member 21 with an open front end, the plurality of locking portions 56 protruding toward an inner surface side of the peripheral wall 55 and locking on an upper surface side of side edges of the long connection member 21, the engaging portions 57 engaging with the engaged portions 23 of the long connection member 21 and allowing the long connection member 21 to move (shift position) in the front-back direction within a predetermined range.

On a rear side of the bottom plate 53, an opening 54 is provided in which the bottom plate 53 is not provided. The openings 54 are portions to which the upper end portions of the electrode terminals 14A and 14B can be inserted, and are each provided with a front-back pair of cut-outs 54A in the middle in the width direction. Since the electrode terminals 14A and 14B each have a cylindrical shape, the cut-outs 54A are defined to accommodate (avoid) the middle portions in the width direction protruding from the front and back of the electrode terminals 14A and 14B. Thereby, the openings 54 allow the electrode terminals 14A and 14B to be inserted therein with gaps maintained in the front-back direction.

The peripheral wall 55 is defined high enough to prevent tools and the like from making contact with the electrode terminals 14A and 14B and the connection members and from causing a short circuit. The peripheral wall 55 is configured with an end wall 55A at a back end and a left-right pair of side walls 55B.

A left-right pair of locking portions 56 are provided on each of the front and back sides of the side walls 55B, the pair of locking portions 56 protruding inwardly from base end portions of the side walls 55B. Each locking portion 56 has a shape having a sloped surface with a protrusion amount increasing downwardly in a sloped manner and a lower end protruding from the peripheral wall 55 in a step-like manner. Each locking portion 56 is provided at a distal end portion (lower end portion) of a bending piece provided between a left-right pair of slits.

Locking strength of the locking portions 56 (strength of locking force decided mainly by distance to the bottom plate 53) is defined such that the long connection members 21 are not detached from between the bottom plates 53 and the locking portions 56, and the long connection members 21 are slidable and movable in the front-back direction. When the long connection member 21 is installed, a side edge of the long connection member 21 is inserted below one of the locking portions 56, and the other side edge is slid along the sloped surface and pushed in, and thereby the long connection members 21 can be installed.

The engaging portions 57 are rectangular (step-like) and project inwardly from base end portions of the side walls 55B in positions corresponding to the engaged portions 23 of the long connection members 21, specifically, in positions of the openings 54 at the front end. A protrusion amount of each engaging portion 57 is slightly smaller than the length of the engaged portion 23 cut out from a side surface of the long connection member 21. Vertical positions of the engaging portions 57 are the same as those of the engaged portions 23 of the long connection members 21. Corners of the engaging portions 57 are tapered to be rounded.

Herein, the front-back direction (connection direction of the long connection member 21) of each engaging portion 57 is shorter than the front-back direction of the engaged portion 23. Specifically, the size of the engaged portion 23 corresponds to the engaging portion 57 with the predetermined clearances CL1 and CL2 added to the front and back of engaging portion 57.

This enables the long connection members 21 to slide and move in the front-back direction with respect to the second unit 51 within a predetermined range of the clearances CL1 and CL2 (CL1+CL2).

The positioning portions 60 are the same as the positioning portions 50 of the first unit 33.

The detector housings 61 are the same as the detector housings 39 of the first unit 33.

A left-right pair of the terminal housings 64 are provided to a back end portion of the second unit 51. Each terminal housing 64 is provided with a bottom plate 65 on which the terminal connection member 27 is placed, a housing wall 67 surrounding the terminal connection member 27 with an open back side, and a pair of locking portions 68 locking the terminal connection member 27 within the terminal housing 64.

Rectangular openings 66 are provided on a front side of the bottom plates 65. The openings 66 each have a size large enough to allow the cylindrical electrode terminals 14A and 14B to be inserted therein. The length in the front-back direction of the opening 66 is defined so as to allow the upper end portions of the electrode terminals 14A and 14B to be inserted with a small gap maintained in the front-back direction.

The housing wall 67 is defined high enough to prevent tools and the like from making contact with the terminal connection members 27 and the heads of the bolts 17 and from causing a short circuit.

The locking portions 68 are provided to a middle portion in the front-back direction of the housing walls 67. The locking portions 68 each have a shape having a sloped surface with a protrusion amount increasing downwardly in a sloped manner and a lower end protruding from an inner surface of the housing wall 67 in a step-like manner. Each locking portion 68 is provided to a distal end portion (lower end portion) of a bending piece provided between a left-right pair of slits. The locking portions 68 prevent detachment of the terminal connection members 27 by locking on an upper surface side (of edges) of the terminal connection members 27.

Installation of the cell connection assembly 20 is described next.

First, the first unit 33 and the second unit 51 are aligned such that the first holders 43 and the second holders 52 of the respective units are continuous, and then, the connection members 21, 25, and 27 as well as the voltage detection terminals 30 crimped with the voltage detection wire W are installed to form the cell connection assembly 20 (FIG. 1).

Next, the positioning portions 50 and 60 of the respective units 33 and 51 are installed so as to be positioned at the respective terminals 15 for voltage detection of the plurality of electric cells 11. Even when there is an error in distance between the terminals 15 for voltage detection (terminals 13), which are guides for positioning, due to variation in dimensional accuracy of the electric cells 11, since the distance between the positioning portion 50 and the positioning portion 60 can be adjusted (the first unit 33 and the second unit 51 can be moved relative to each other in the front-back direction) by a distance equivalent to two times of the clearances CL1 and CL2 (2×(CL1+CL2)) between the engaging portions 49 and 57 and the engaged portions 23 (two is the number of the engaging portions 49 and 57 (the engaged portions 23) provided in the front and back respectively), positioning of the cell connection assembly 20 can be readily performed. In a state where the positioning portions 50 and 60 are positioned, the long connection members 21 are slidable and movable in the front-back direction within a size of the clearances CL1 and CL2 (CL1+CL2) provided between the engaging portions 49 and 57 and the engaged portions 23.

Thereafter, the shaft of one bolt 17 is inserted into one through-hole 22 of the long connection member 21, and the long connection member 21 is bolted between the electrode terminal 14A and the electrode terminal 14B. At this point, even when the through-hole 22 and the electrode terminals 14A and 14B are not aligned, a dimensional error can be accommodated because the long connection member 21 is slidable and movable and the through-hole 22 has an anteroposteriorly elongated oval shape. Thus, bolting work becomes easier.

Next, the shaft of another bolt 17 is inserted into the other through-hole 22 of the long connection member 21, and the long connection member 21 is bolted to the electrode terminals 14A and 14B. Since the through-hole 22 has an anteroposteriorly elongated oval shape, although the position of the long connection member 21 is fixed at this time, a dimensional error can be accommodated, making bolting work easier.

Next, the short connection member 25 is bolted on each of the electrode terminals 14A and 14B by the bolts 17. The short connection member 25 may be bolted before the long connection member 21 is bolted.

The present embodiment provides the following effects.

(1) The cell connection assembly 20 includes the first unit 33 holding the front side (one side in the connection direction of the connection member) and the second unit 51 holding the back side (the other side in the connection direction of the connection member), and (at least one of) the first unit 33 and the second unit 51 are configured to be slidable and movable in the front-back direction (connection direction of the connection member) with respect to the long connection member 21 (connection member).

Thus, even when there is a dimensional error between the plurality of electric cells 11 and the cell connection assembly 20 to be attached thereto, (at least one of) the first unit 33 and the second unit 51 are configured to be slidable and movable in the front-back direction (connection direction of the connection member) with respect to the long connection member 21. Positions of the first unit 33 and the second unit 51 relative to each other can be thus changed with the long connection member 21 in response to the dimensional error. Therefore, flaws in installation of the cell connection assembly 20 due to the dimensional error or the like can be prevented.

(2) While the engaged portions 23 are provided to the side edges in the connection direction of the long connection members 21 (connection members), (at least one of) the first unit 33 and the second unit 51 are provided with the engaging portions 49 and 57 that engage with the engaged portions 23 with the predetermined clearances CL1 and CL2 in the connection direction.

For example, after fixating each of the units 33 and 51 on the electric cells 11 by a member other than the long connection members 21, the long connection members 21 become slidable and movable within a range of the predetermined clearances CL1 and CL2. Therefore, even when there is a dimensional error between the electrode terminals 14A and the electrode terminals 14B, the long connection members 21 are able to move in the connection direction within the range of the predetermined clearances CL1 and CL2, resulting in easy installation of the long connection members 21.

(3) The engaging portions 49, the engaging portions 57, and the engaged portions 23 are provided in a plurality of positions in the front-back direction (connection direction). Thereby, compared to a case where the engaging portion 49, the engaging portion 57, and the engaged portion 23 are each provided in one position, it becomes possible to accommodate a larger dimensional error and to better prevent flaws in installation of the cell connection assembly 20.

(4) The first unit 33 and the second unit 51 are provided with the positioning portions 50 and 60, respectively, for positioning with respect to the electric cells 11, the positioning portions 50 and 60 being provided in positions different from the long connection member 21 (connection member). The first unit 33 and the second unit 51 can thus be positioned by the positioning portions 50 and 60, making it easy to fixate the connection members 21 when fixated after positioning of the first unit 33 and the second unit 51.

(5) The cell connection assembly 20 is fixated to the electric cells 11 by inserting the shafts of the bolts 17 into the through-holes 22 (through-holes) of the connection members 21. The through-holes 22 each have an oval shape elongated in the front-back direction (connection direction of the connection member).

Since the through-holes 22 (through-holes) of the connection members 21 each have an anteroposteriorly elongated oval shape, even when there is a dimensional error due to variation in dimensional accuracy between the electrode terminal 14A and the electrode terminal 14B, it becomes possible to accommodate the dimensional error and to insert the shafts of the bolts 17 into the through-holes 22 of the long connection members 21.

The plurality of electric cells 11 each have a flat shape and are aligned in the long-length direction of the surface having the electrode terminals 14A and 14B.

Depending on dimensional accuracy of the electric cells 11, positions of the electrode terminals 14A and 14B vary. Variation in dimensional accuracy is more likely to occur particularly in the long-length direction of the electric cells 11 due to its length, and thus, a dimensional error between the plurality of electric cells 11 and the cell connection assembly 20 is likely to be greater. According to the present embodiment, however, it is possible to prevent flaws caused by the dimensional error in a case where such a dimensional error is likely to occur.

(7) The plurality of electric cells 11 are also aligned in the left-right direction (short-length direction of the surface having the electrode terminals 14A and 14B) and are provided with the short connection member 25 (other connection member) connecting the electrode terminal 14A and the electrode terminal 14B aligned in the left-right direction (short-length direction). Therefore, it is possible to increase a degree of freedom in connecting the plurality of electric cells 11.

Other Embodiments

The present invention is not limited to the embodiment explained with the descriptions and drawings above, and includes the following embodiments, for example, in its technical range.

(1) In the embodiment above, the engaging portions 49 and 57 and the engaged portions 23 were provided to both the first unit 33 and the second unit 51; however, without being limited thereto, the engaging portions 49 and 57 and the engaged portions 23 may be provided to either the first unit 33 or the second unit 51. Even when doing so, it is possible to prevent flaws in installation of the cell connection assembly 20 with the clearances CL1 and CL2 provided by the engaging portions 49 and 57 and the engaged portions 23 provided to at least one of the units.

(2) The long connection members 21 may be configured to be slidable and movable with respect to each of the units 33 and 51, without providing the engaging portions 49 and 57 and the engaged portions 23. For example, the long connection members 21 may be configured to be slidable and movable with no limitation in range (regardless of the clearances).

(3) In the embodiment above, the long connection members 21 were configured to be slidable and movable with respect to each of the units 33 and 51; however, a connection member, which is shorter than the long connection member 21, may slide and move. For example, two units may be connected by the short connection member 25, and the short connection member 25 may be configured to be slidable and movable. In this case, an engaged portion may be provided to the short connection member 25, and an engaging portion may be provided to the two units.

(4) In the embodiment above, the engaged portions 23 were provided as recesses in the long connection members 21, and the engaging portions 49 and 57 are provided as projections projecting from the units 33 and 51, respectively. However, without being limited thereto, engaged portions may be provided as projections projecting from the long connection members 21 and engaging portions may be provided as recesses in the units 33 and 51.

(5) In the embodiment above, the nut-shaped terminals 13 of each electric cell 11 were fastened by the bolts 17 as separate members; however, without being limited thereto, a configuration may be made in which a terminal has a bar-shaped shaft having a thread groove on an outer peripheral surface, and a connection member is fixated to the terminal by fastening a nut as a separate member. In such a case, the shaft of the terminal is inserted into a through-hole of each connection member.

(6) The embodiment above explained the case in which the plurality of electric cells 11 were connected in series; however, without being limited thereto, the present invention may be applied to a case where the plurality of electric cells 11 are connected in parallel.

(7) The number of electric cells 11 configuring the battery module 10 was four; however, without being limited thereto, the number of electric cells 11 may be three or less or five or more. The configuration of the cell connection assembly may be set according to the number of electric cells as well.

(8) In the embodiment above, two long connection members 21 were attached to the cell connection assembly 20; however, without being limited thereto, one long connection member 21 or three or more long connection members 21 may be attached. Further, a battery module may be constructed by attaching a plurality of cell connection assemblies (the number of the long connection member may be set as needed) to the plurality of electric cells 11.

REFERENCE SIGNS LIST

10: Battery module
11: Electric cell
12A: Terminal surface
13: Terminal
14A, 14B: Electrode terminal
15: Terminal for voltage detection 17: Bolt
20: Cell connection assembly
21: Long connection member (connection member)
22, 26, 28: Through-hole
23: Engaged portion
25: Short connection member (the other connection member)
27: Terminal connection member
30: Voltage detection terminal
33: First unit
34: Short housing
39: Detector housing
40, 45, 54, 66: Openings
43: First holder
47, 55: Peripheral wall
47B, 55B: Side wall
48, 56, 68: Locking portion
49, 57: Engaging portion
50, 60: Positioning portion
51: Second unit
52: Second holder
CL1, CL2: Clearance
W: Voltage detection wire W

The invention claimed is:

1. A cell connection assembly, comprising:
a connection member connecting electrode terminals of adjacent electric cells in a battery module including a plurality of electric cells having positive and negative electrode terminals, wherein the connection member is a metal plate of metal material;
a first unit having a first holder defined by a first bottom wall and a first peripheral wall extending upwardly from a periphery of the first bottom wall, thereby providing a first housing that receives a first end of the connection member in a connection direction of the connection member, wherein the first peripheral wall partially surrounds edges of the first end of the connection member, and
a second unit having a second holder defined by a second bottom wall and a second peripheral wall extending upwardly from a periphery of the second bottom wall, thereby providing a second housing that receives a second end of the connection member in the connection direction of the connection member, wherein the second peripheral wall partially surrounds edges of the second end of the connection member, wherein the second unit is different from the first unit, and wherein
at least one of the first housing and the second housing is movable relative to the other of the first housing and the second housing with respect to the connection member in the connection direction of the connection member, wherein
the connection member is provided with an engaged portion, and
an engaging portion is provided on at least one of the first housing and the second housing, the engaging portion engaging the engaged portion with a clearance therebetween in the connection direction of the connection member, and
the engaged portion is defined by one of a recess and a protrusion provided in an outer periphery of the metal plate,
wherein, when the engaged portion is defined by the recess in the outer periphery of the metal plate, the engaging portion is defined by a cooperating protrusion provided on the at least one of the first housing and the second housing, and
wherein, when the engaged portion is defined by the protrusion provided in the outer periphery of the metal plate, the engaging portion is defined by a cooperating recess provided on the at least one of the first housing and the second housing.

2. The cell connection assembly according to claim 1, wherein the engaged portion is provided to a side edge of the connection member in the connection direction of the connection member.

3. The cell connection assembly according to claim 1, wherein the engaging portion and the engaged portion are provided in a plurality of positions in the connection direction of the connection member.

4. The cell connection assembly according to claim 1, wherein a positioning portion is provided to each of the first unit and the second unit in a position different from the connection member, the positioning portion positioning each of the first unit and the second unit with respect to the electric cells.

5. The cell connection assembly according to claim 1, wherein one of a bar-shaped electrode terminal and a shaft of a bolt is inserted into a through-hole of the connection member to fixate the cell connection assembly to the electric cells, and
the through-hole has an oval shape elongated in the connection direction of the connection member.

6. The cell connection assembly according to claim 1, wherein the plurality of electric cells are flat and aligned along a long-length direction of a surface having the electrode terminals.

7. The cell connection assembly according to claim 6, wherein the plurality of electric cells are also aligned along a short-length direction of the surface having the electrode terminals, and a second connection member is provided to connect the electrode terminals of adjacent electric cells aligned along the short-length direction.

8. The cell connection assembly according to claim 1, further comprising:
a first opening formed in the first housing adjacent the first bottom wall, and wherein the first opening is configured to receive insertion of a first one of electrode terminals of adjacent electric cells, and
a second opening formed in the second housing adjacent the second bottom wall, and wherein the second opening is configured to receive insertion of a second one of electrode terminals of adjacent electric cells.

9. The cell connection assembly according to claim 1, further comprising:
a first opening formed in the first housing adjacent the first bottom wall, and wherein the first opening is configured to receive insertion of a first one of electrode terminals of adjacent electric cells,
a second opening formed in the second housing adjacent the second bottom wall, and wherein the second opening is configured to receive insertion of a second one of electrode terminals of adjacent electric cells, and
wherein the engaging portion is contiguous with at least one of the first and second openings.

* * * * *